TAPE RECORDER AUTOMATIC BLOCK SELECTOR

Filed April 6, 1960 2 Sheets-Sheet 1

Inventor
L. Namenyi-Katz
By Glascock Downing & Seebold Attys.

Inventor
L. Namenyi-Katz
By Mason, Kolehmainen, Rathburn & Wyss Downing Seebold
Attys.

United States Patent Office 3,115,289

Patented Dec. 24, 1963

3,115,289

TAPE RECORDER AUTOMATIC BLOCK SELECTOR

Laszlo Namenyi-Katz, Bedfont, Feltham, England, assignor to Epsylon Research and Development Company Limited, Bedfont, Feltham, England Filed Apr. 6, 1960, Ser. No. 20,314
Claims priority, application Great Britain Apr. 7, 1959
6 Claims. (Cl. 226—42)

This invention relates to magnetic tape recorders and has for its object to provide an arrangement by which any particular block along the length of the tape may be selected automatically.

The width of track required on a magnetic tape for high quality recording of speech or music is quite narrow and it is, for example, possible to record as many as 40 separate parallel tracks on a magnetic tape having a width of only one inch. It is also possible, by rapidly reversing the tape and at the same time changing from one track to the next, to record continuously throughout all the tracks on the tape so that, for example, if the tape has 40 tracks, the effect so far as recording and playback is concerned is the same as if a single track tape of 40 times the length were used. If the tape length is, say 600 ft. then at a recording speed of 3¾ inches per second, a single track will provide a recording or playback time of 32 minutes and 40 tracks will provide continuous recording or playback for over twenty hours.

It is advantageous to be able to use such a tape to record and play back a number of different recordings and it then becomes necessary to be able to select the appropriate track and the correct point on that track at which a required recording or an unrecorded section begins. For example, a 40 track tape may be divided longitudinally into 25 blocks, in which case it will accommodate 1000 separate short recordings or a smaller number of recordings of varying lengths, each of which occupies more than one block. In order to find a required recording it is necessary to select the appropriate track and then to select the appropriate point along the length of the tape. In the specification of United States Patent No. 2,898,113 assigned to the assignees of the present application there is described an automatic track changing device which automatically moves from one track to the next on receiving a signal indicating that the end of the tape has been reached. The movement of the head from one track to the next operates contacts which also cause the direction of movement of the tape to be reversed. This particular arrangement ensures that recording and playback may continue uninterruptedly through the whole of the tracks on the tape. The device also permits a particular track to be selected manually.

The object of the present invention is to provide an automatic block selection device by which a particular block along the length of the tape may be selected. It may then be arranged that the track on which a desired recording commences is selected by means of the device described in the patent specification above referred to and the appropriate block along the length of the tape is selected by the device according to the present invention. The recorder is set in motion and the tape is automatically spooled at a high speed until the selected point is reached, when the tape is stopped or its speed is automatically reduced to playback speed and playback commences. The machine will then continue to play back until the end of the last track is reached. Alternatively it may be stopped when the end of a recording is reached an another recording on an entirely different part of the tape may be selected by appropriate operation of the two devices.

In using the device according to the invention it is necessary to provide marks along the length of the tape. One method of marking is described hereinafter. An alternative method is to provide an extra track upon which signals are recorded only at the block boundaries, a separate playback head being provided which responds to these signals and is connected to the control means for changing the tape speed. A further method is to record signals of sub-sonic or supersonic frequencies in one of the ordinary tracks and to provide filters which direct these special signals to the control means. Yet another method is to attach a small piece of shiny metal foil to the uncoated side of the tape, a light source and a photoelectric device being arranged on that side of the tape so that light from the source is reflected by the tape surface into the photoelectric device. In place of the light source and photoelectric device a pair of contacts may be provided, bearing lightly on the tape surface, the contacts being short-circuited by the metal foil and thereby causing the control means to operate. Instead of the foil a spot of a magnetic medium may be placed on the uncoated side of the tape and an additional playback head, placed on that side of the tape, may be arranged to respond to signals recorded on the spot, the additional head being connected to the control means.

Broadly, the invention consists of a selector mechanism in a tape recorder for selecting a desired point on the tape from a plurality of points defined by marks along the length of the tape which comprises a first rotatable member carried on the recorder structure and driven in synchronism with the tape so as to make not more than one complete revolution during the traverse of the whole length of the tape. A second member is carried by the first member and is rotatable therewith, and means are provided for adjusting the rotational position of the second member with respect to the first member, there being indicating means associated with the adjusting means for pre-selecting the desired point on the tape. A switch is mounted on the structure and the second member is provided with means to actuate the switch, the switch being connected in circuit with a sensing device responsive to the marks on the tape. The switch actuating means is so positioned with respect to the second member that the sensing device is alerted by the switch when the desired point is being approached and the sensing device produces a signal when this point is reached.

The first member may comprise a graduated dial, the second member may comprise a shaft carrying a pointer, and the two members may be coupled by a friction coupling.

The first member may be driven by a guide roller by which the tape is guided through the recorder and the drive may be transmitted therefrom to the first member by worm reduction gearing.

A preferred embodiment of the invention will now be described, by way of example, in relation to the accompanying drawings in which.

Figures 1, 3:
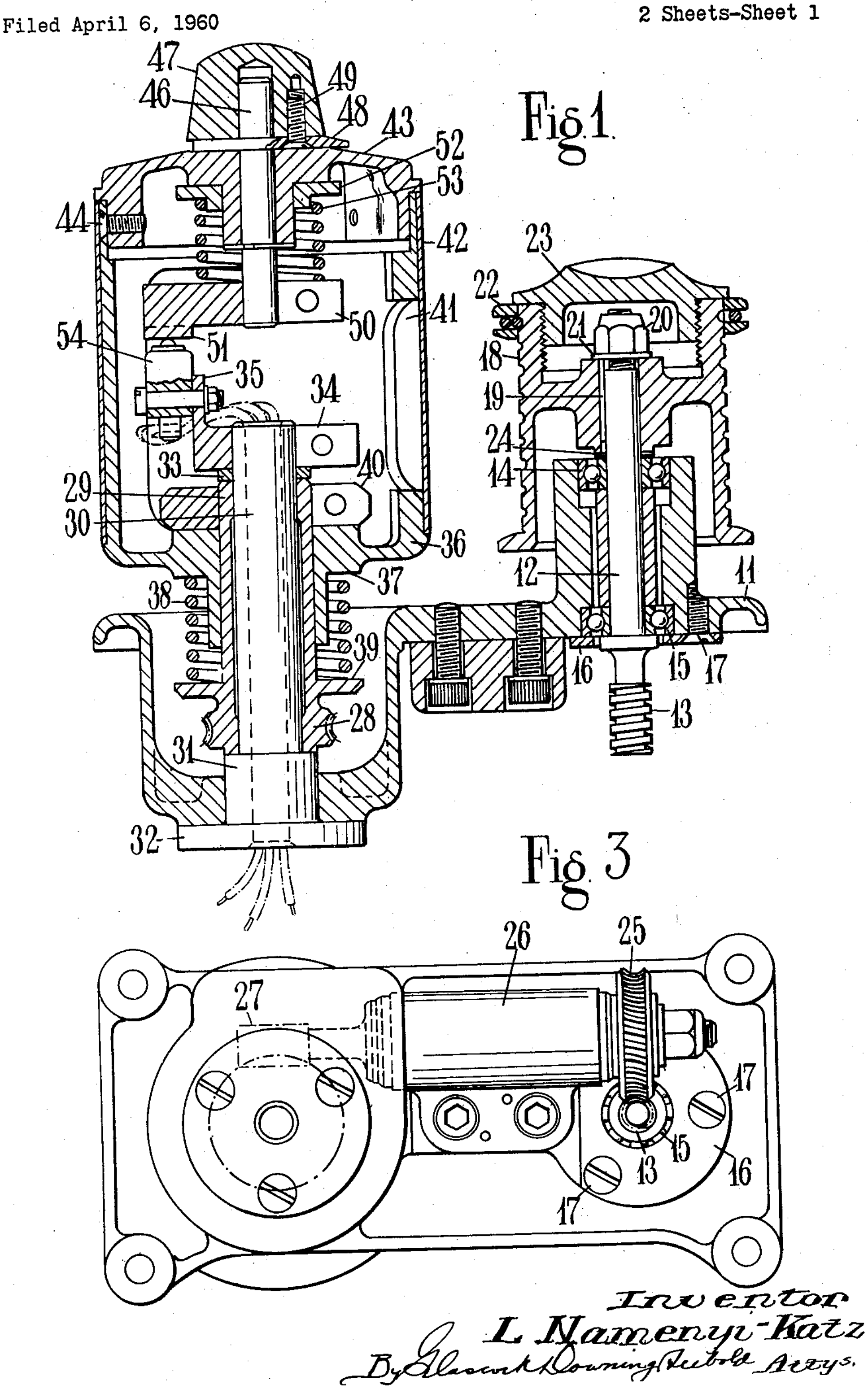
FIGURE 1 shows in vertical cross-section a block selector according to the invention.
FIGURE 3 is an inverted plan view of the block selector of FIGURE 1.

Referring to the drawings, and initially to FIGURE 1, the block selector according to one embodiment of the invention comprises a base plate 11 which is formed at one end to receive a shaft 12 having a worm 13 projecting below the base plate. The shaft 12 is carried in an upper ball bearing 14 and a lower ball bearing 15, the latter being retained in position by a plate 16 held in position by three screws 17. At the upper end of the shaft 12 a tape guide roller 18 is located by a key 19 and secured by a nut 20, a washer 21 being interposed between the internal boss of the guide roller and the nut 20. An axially adjustable guide ring 22 is provided so that the tape recorder may be adapted for tapes of different standard widths. The guiding ring 22 has three equally spaced balls or plungers located in radial holes and projecting into its bore, the balls or plungers being pressed inwardly by a peripheral spring ring to engage any one of a number of axially spaced circumferential grooves in the guide roller 18. The upper end of the guide roller is closed by a cap 23 which also serves to prevent the movable flange 22 from being moved beyond an extreme position. To ensure that the tape is maintained at the correct height in relation to the upper surface of the tape deck a shim 24 of selected thickness is placed between the ball bearing 14 and the lower face of the boss of the guide roller 18. The worm 13 is engaged by a worm wheel 25 (FIGURE 2) on the end of a shaft carried in a bearing bracket 26 attached to a face underneath the base. The other end of the shaft carrying the worm wheel 25 is formed with a worm 27 which projects through an opening (not shown) in a downwardly projecting pot-shaped extension of the base to engage a worm wheel 28 which is integral with a hollow shaft 29 constituting the aforementioned first rotatable member, and by virtue of the double worm reduction gearing the shaft 29 is arranged to make not more than one revolution during the traverse of the whole length of the tape. A fixed shaft 30 having an enlarged portion 31 at its lower end and terminating in a flange 32 is attached at the bottom of the aforementioned pot-shaped downward extension of the base and projects upwardly through the bore of the hollow shaft 29. The hollow shaft 29 is a running fit on the fixed shaft 30. Above the end of the hollow shaft 29 is a washer 33 and, above the washer, a clamp 34 is secured to the fixed shaft 30. The clamp 34 carries an extension 35 which will be referred to later.

A vertically disposed cylindrical housing 36, constituting the aforementioned second rotatable member has a downwardly extending portion which is a running fit on the outer diameter of the hollow shaft 29. Near its lower end, the housing 36 is provided with a shoulder 37 and a compression spring 38 is disposed between the shoulder 37 and a shoulder 39 integral with the hollow shaft 29. The spring 38 is in compression when the parts are assembled and the housing 36 is prevented from moving upwardly under the influence of this spring by a clamp 40 secured to the hollow shaft 29. This arrangement provides frictional engagement between the hollow shaft 29 and the housing 36. The tubular portion of the housing 36 is provided with an opening 41 through which the parts contained in the housing may be adjusted and the opening is covered by a tubular cover 42.

Located in the upper end of the housing 36 is a head 43 which is secured to the housing by a plurality of screws 44. The upper face of the housing 43 is slightly coned and carries suitable markings 62 (FIGURE 2) to indicate the number of blocks on the tape. Concentrically mounted within the head 43 is a vertical spindle 46 having a knob 47 secured at its upper end. A pointer 48 is secured to the under face of the knob by a plurality of screws 49. The shaft 46 has a clamp 50 attached at its lower end, the clamp being formed with a downwardly projecting face cam 51. A flanged member 52 lies against a shoulder formed in the housing 43 and a compression spring 53 is disposed between the lower face of the flanged member 52 and the upper face of the clamp 50. The spring 53 is in compression and there is thus frictional engagement between the lower face of the pointer 48 and the face in the housing against which the member 52 bears.

The two springs 38 and 53 are of such strength, and the associated friction faces are so proportioned, that the frictional engagement between the hollow shaft 29 and the housing 36 is substantially greater than that between the shaft 46 and the housing 43, so that it is possible to rotate the pointer 48 by means of the knob 47 without rotating the housing 36 with respect to the shaft 29.

A switch 54, which may conveniently be of the kind shown as a micro-switch, is attached to the extension 35 on the clamp 34 and its operating button is adapted to be engaged by the cam 51.

In operation the tape passing through the tape recorder drives the tape guide roller 18 and, in turn, drives the wormwheel 25 through the worm 13. The worm 27 on the same shaft as the worm wheel 25 drives the worm 28 which rotates the housing 36. When a tape is first fitted to the machine, the housing 36 is manually rotated so that the zero marking on the top of the head 43 is brought into line with a datum mark (not shown) on the fixed structure of the recorder. As the tape is fed through the recorder the housing 36 is slowly rotated and the block markings on the top of the head 43 move past the aforementioned datum mark so that the block markings show which of the blocks along the length of the tape is passing the recording and playback heads. These markings may serve as a footage indicator. By rotating the knob 47 and the pointer 48 so that the latter points to a desired block, cam 51 is rotated with respect to the housing 46 to such a position that before the beginning of the desired block is reached the cam 51 engages the switch 54 and places it in the "on" position.

Figures 2, 4, 5:
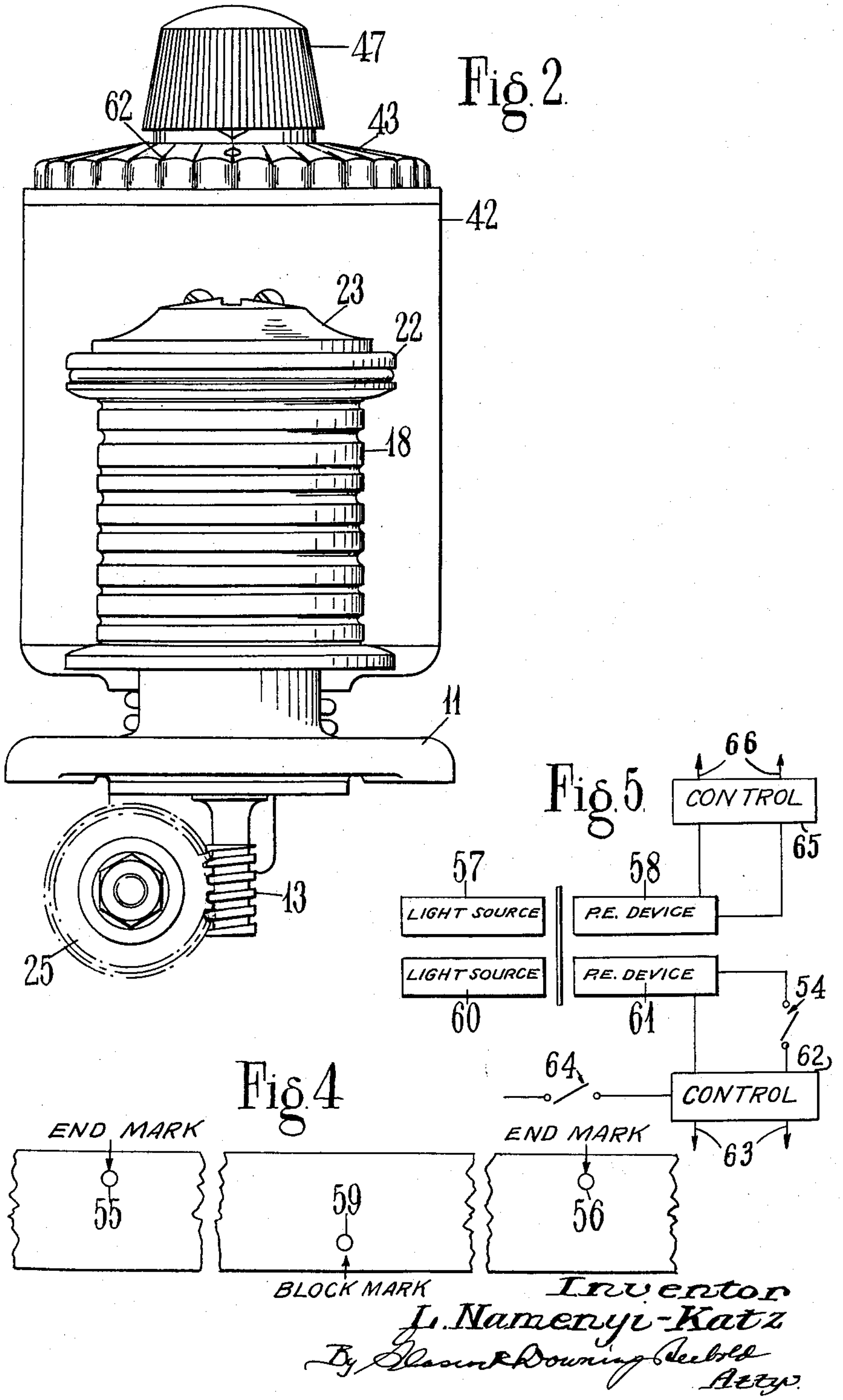
FIGURE 2 is an end elevation of the block selector of FIGURE 1.
FIGURE 4 shows how the tape is "marked" at its ends and at intermediate points.
FIGURE 5 shows a section of the tape and a photoelectric control arrangement for traversing and reversing the tape.

The tape is divided into the desired number of blocks by the means shown in FIGURE 4. As seen in that figure a transparent spot 55 is provided towards one edge of the tape near one of its ends and a second transparent spot 56 is provided, towards the same edge of the tape as the spot 55, near the other end of the tape. At a suitable point on the machine a light source 57 (so labelled in FIGURE 5) is provided to project a beam of light on to the tape surface and on the opposite side of the tape a photoelectric device 58 (labelled "P.E. Device" in FIGURE 5) is provided. The transparent markings dividing the blocks of which the marking 59 of FIGURE 4 is representative, are made near the edge of the tape opposite to that occupied by the two end markings 55 and 56. The photoelectric device 58 provides a signal applied to a control device 65 which is not described in detail, because its arrangement will be obvious to those skilled in the art. The effect of the signal from the device 58 is to produce a reversing signal on lines 66 leading from the control 65 which causes the direction of rotation of the motor to be reversed. A second light source 60, and a second photoelectric device 61, are arranged on opposite sides of the tape in the path of the markings 59.

In operation the tape is automatically reversed and the next track is automatically selected whenever the mark 55 or the mark 56 passes between the light source 57 and the photoelectric device 58. The switch 54 is connected in series either with the light source 60 or the photoelectric device 61, as shown in FIG. 5, so that at least one of these is inoperative until the tape is approaching the beginning of the desired block, when the switch 54 is placed in the "on" position by the cam 51. The light source 60 and photoelectric device 61 are thus alerted and become operative and as soon as the next block marking 59 (the required one) passes between them the device 61 produces a signal which is applied to a further control 62, which again is not described in detail since its arrangement will be obvious to those skilled in the art. The control 62 provides a signal on lines 63 which results in the motor being slowed down and the playback head being switched in, so that the instrument begins to play back the recording.

The method just described, of "marking" the tape by means of transparent spots, is only one of several which may be adopted. Others were described earlier. If a particular recording occupies more than one block along the length of the tape then the transparent spot will cause a momentary interruption of the recording because the oxide coating must be removed from the spot.

With the arrangement according to the invention it is possible to set the pointer 43 to a desired block and the appropriate track may be selected by the device previously referred to. The machine may then be set in operation for example, by actuating a switch 64 associated with the control 62 to spool the tape at a high speed until the desired block is reached when it automatically changes to play back speed and it begins to play back the recording. Alternatively it may be arranged to stop, so that it may be started at recording speed when a new recording is to be made.

Various modifications may be made to the embodiment above described without departing from the scope of the invention as defined in the appended claims.

I claim:

1. In a tape recorder, a selector mechanism for selecting a desired point on said tape from a plurality of points defined by marks along the length of said tape comprising supporting structure, a first rotatable member carried on said structure and driven in synchronism with said tape so as to make not more than one complete revolution during the traverse of the whole length of said tape, a second member carried by said first member and rotatable therewith, means for adjusting the rotational position of said second member with respect to said first member, indicating means associated with said adjusting means for pre-selecting said point on said tape, a switch mounted on said structure, means to actuate said switch carried on said second member, and a sensing device responsive to said marks on said tape, said switch being connected in circuit with said sensing device to alert said sensing device when said switch is actuated, said actuating means being so positioned with respect to said second member that said sensing device is alerted when said point is being approached, and said sensing device produces a signal when said point is reached.

2. A mechanism as claimed in claim 1 wherein said first and second members are coupled by a friction coupling.

3. A mechanism as claimed in claim 1 comprising a guide roller rotated by said tape by which said tape is guided through the recorder, said guide roller driving said first member.

4. A mechanism as claimed in claim 3 comprising worm reduction gearing to transmit the drive from said guide roller to said first member.

5. A mechanism as claim 4 comprising a second friction coupling between said first member and said worm reduction gearing, whereby said indicating means may be initially set to a zero position corresponding to one end position of said tape.

6. A mechanism as claim 5, wherein said sensing device is adapted to actuate control means to reduce the tape speed from a high speed to that appropriate for recording or playback.

References Cited in the file of this patent

UNITED STATES PATENTS

| | | |
|---|---|---|
| Re. 22,970 | Begun | Feb. 10, 1948 |
| 2,703,714 | Demby et al. | Mar. 8, 1955 |